(12) United States Patent
Gatt

(10) Patent No.: US 7,090,510 B1
(45) Date of Patent: Aug. 15, 2006

(54) AUDIO INPUT JACK ASSEMBLY IN A VEHICLE

(75) Inventor: Mark Vincent Gatt, Howell, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 503 days.

(21) Appl. No.: 10/063,234

(22) Filed: Apr. 2, 2002

(51) Int. Cl.
H01R 12/00 (2006.01)

(52) U.S. Cl. ........................ 439/76.1; 439/668; 381/86

(58) Field of Classification Search ............... 439/76.1, 439/668; 381/86
See application file for complete search history.

(56) References Cited

U.S. PATENT DOCUMENTS

| | | | |
|---|---|---|---|
| 3,947,815 A | 3/1976 | Muncheryan | |
| 4,248,494 A | 2/1981 | McDonald et al. | |
| 4,626,057 A | 12/1986 | Knickerbocker | |
| 4,811,314 A | 3/1989 | Alves | |
| 4,866,515 A * | 9/1989 | Tagawa et al. | 725/77 |
| 5,289,378 A * | 2/1994 | Miller et al. | 701/35 |
| 5,555,491 A * | 9/1996 | Tao | 361/686 |
| 5,562,475 A | 10/1996 | Kern, Jr. et al. | |
| 5,593,323 A | 1/1997 | Dernehl | |
| 5,666,291 A * | 9/1997 | Scott et al. | 709/250 |
| 5,714,805 A * | 2/1998 | Lobaugh | 307/10.1 |
| 5,790,787 A * | 8/1998 | Scott et al. | 709/250 |
| 6,055,478 A * | 4/2000 | Heron | 701/213 |
| 6,127,919 A * | 10/2000 | Wylin | 340/425.5 |
| 6,157,725 A * | 12/2000 | Becker | 381/86 |
| 6,164,792 A | 12/2000 | Nakagome | |
| 6,290,508 B1 * | 9/2001 | Wu | 439/76.1 |
| 6,374,177 B1 * | 4/2002 | Lee et al. | 701/200 |
| 6,443,574 B1 * | 9/2002 | Howell et al. | 353/13 |
| 6,478,629 B1 * | 11/2002 | Li et al. | 439/668 |
| 6,499,027 B1 * | 12/2002 | Weinberger | 707/4 |
| 6,526,335 B1 * | 2/2003 | Treyz et al. | 701/1 |
| 6,526,460 B1 * | 2/2003 | Dauner et al. | 710/65 |
| 6,871,356 B1 * | 3/2005 | Chang | 725/75 |
| 7,011,550 B1 * | 3/2006 | Lai et al. | 439/638 |
| 7,033,226 B1 * | 4/2006 | Chien et al. | 439/668 |
| 7,039,196 B1 * | 5/2006 | Becker et al. | 381/86 |
| 2001/0011200 A1 * | 8/2001 | Kobayashi et al. | 701/36 |
| 2001/0028717 A1 * | 10/2001 | Ohmura et al. | 381/86 |
| 2001/0048749 A1 * | 12/2001 | Ohmura et al. | 381/86 |
| 2002/0015502 A1 * | 2/2002 | Albus et al. | 381/86 |
| 2002/0052148 A1 * | 5/2002 | Nagata | 439/668 |
| 2002/0119706 A1 * | 8/2002 | Sagues et al. | 439/638 |
| 2002/0142764 A1 * | 10/2002 | Newell et al. | 455/419 |
| 2002/0152264 A1 * | 10/2002 | Yamasaki | 709/203 |
| 2002/0193006 A1 * | 12/2002 | Ma et al. | 439/669 |
| 2002/0196134 A1 * | 12/2002 | Lutter et al. | 340/426 |
| 2003/0007649 A1 * | 1/2003 | Riggs | 381/86 |

(Continued)

Primary Examiner—Ross Gushi
(74) Attorney, Agent, or Firm—David B. Kelley; Artz and Artz

(57) ABSTRACT

A system for providing an auxiliary audio input for a vehicular entertainment sound system (VESS) (42) includes a portable electronic audio device (48) for generating an auxiliary plurality of audio signals. An auxiliary output line (50) terminating at an end with a plug (52) is coupled to the portable electronic audio device (48). The plug (52) is mated with an audio input jack assembly (10) that is fixedly coupled to a remotely located region (40) of an automotive vehicle external to the VESS (42). The auxiliary plurality of audio signals are then communicated through the auxiliary output line (50) to the audio input jack assembly (10). Then, the auxiliary plurality of audio signals are transmitted through an auxiliary input line (58) to the VESS (42).

20 Claims, 3 Drawing Sheets

U.S. PATENT DOCUMENTS

| | | | |
|---|---|---|---|
| 2003/0026439 A1* | 2/2003 | Yamamoto | 381/86 |
| 2003/0026440 A1* | 2/2003 | Lazzeroni et al. | 381/86 |
| 2003/0036360 A1* | 2/2003 | Russell et al. | 455/66 |
| 2003/0053638 A1* | 3/2003 | Yasuhara | 381/86 |
| 2003/0215102 A1* | 11/2003 | Marlowe | 381/77 |
| 2004/0156514 A1* | 8/2004 | Fletcher et al. | 381/86 |
| 2006/0029235 A1* | 2/2006 | Lazzeroni et al. | 381/86 |
| 2006/0050894 A1* | 3/2006 | Boddicker et al. | 381/77 |
| 2006/0089054 A1* | 4/2006 | Woo | 439/668 |

* cited by examiner

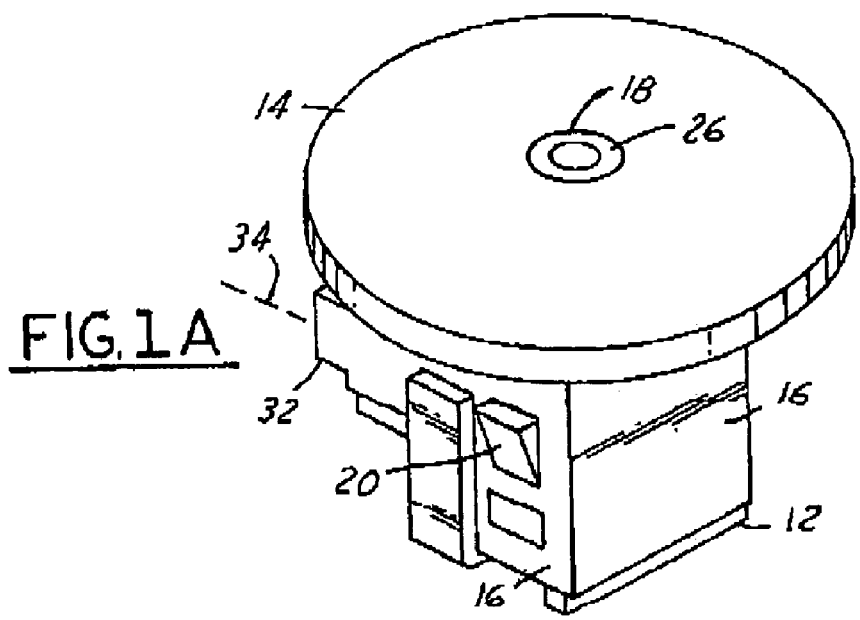
FIG. 1A
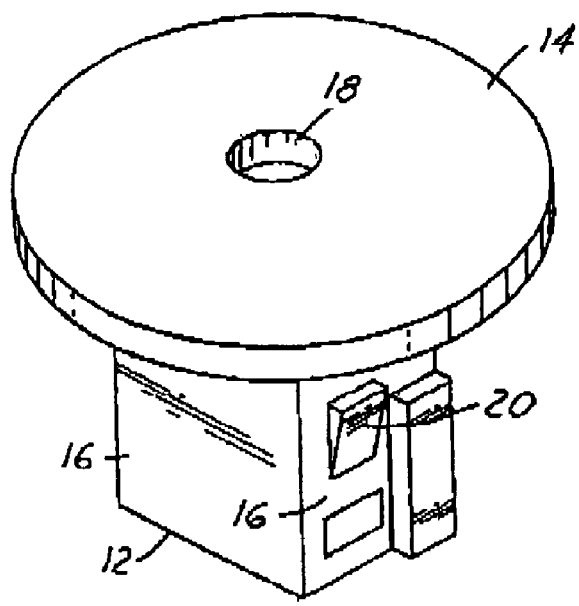
FIG. 1B
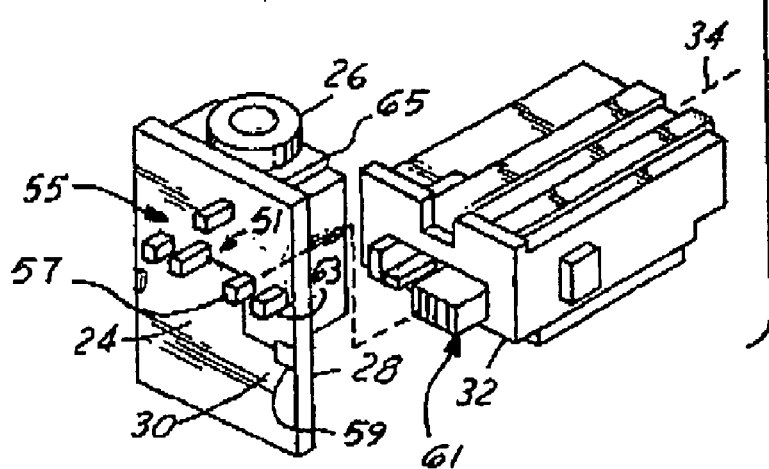

AUDIO INPUT JACK ASSEMBLY IN A VEHICLE

BACKGROUND OF INVENTION

1. Technical Field

The present invention relates generally to a vehicular entertainment sound system (VESS), and more particularly to an audio input jack assembly for supplying an auxiliary plurality of audio signals from a portable electronic audio device to the VESS.

2. Background Art

A vehicular entertainment sound system (VESS), depending upon its components, presently receives a plurality of audio signals from various forms of media. For example, a system having a compact disk player (CD player) receives a plurality of audio signals from a compact disk (CD). Likewise, a system including an audiocassette tape player may receive a plurality of audio signals from an audiocassette tape.

Many vehicular occupants are prevented from listening to the media they wish to hear because they do not have a VESS with the component necessary for playing such media. Moreover, many of the same people own portable electronic audio devices capable of playing such media. In view of these circumstances, attempts have been made to allow a VESS to receive audio signals from a portable electronic audio device.

Currently, a car adaptor kit permits a VESS having an audiocassette tape player to receive audio signals from a portable CD player. The portable CD player reads the CD thereby creating a plurality of audio signals. The audio signals are then transmitted through an output line to an adaptor. Contained within a housing shaped as a conventional audiocassette tape, the adaptor is then inserted into the audiocassette tape player of the VESS. Once inside the audiocassette tape player, the adaptor converts the audio signals to a magnetic field that is subsequently detected by the audiotape cassette player. As one skilled in the art would know, the tape player detects these magnetic waves and converts them into audio signals for acoustical transmission on the VESS in the usual manner an audiotape cassette player reads an audiotape cassette.

However, the car adaptor kit is limited to applications involving a portable CD player and a VESS having an audiocassette tape player integrated therein. For example, an individual who has a VESS, lacking both a CD player component and an audiotape cassette player component, cannot acoustically play a CD on the VESS even though he may own a car adaptor kit. Therefore, these particular car adaptor kits do not provide auxiliary audio input for the vehicular occupant.

Moreover, most car adaptor kits frequently require direct attachment to the VESS thereby causing inconveniences to the user. For example, the output line of the CD player frequently extends outward from the audiocassette tape player of the VESS and subsequently draping over the VESS controls and the gearshift. Consequently, access to VESS controls and the gearshift is typically impeded. An additional drawback of the car adaptor kit is the unclean appearance of wires hanging in plain view.

Therefore, a need exists for a robust vehicular audio input connector that allows for the transmission of audio signals from various electronic portable devices to a VESS. Also, a need exists for an audio input connector that eliminates obstructed access to VESS controls and the gearshift.

SUMMARY OF INVENTION

The present invention provides an audio input jack assembly that transmits audio signals from various portable electronic audio devices to a vehicular entertainment sound system (VESS). The invention also provides an audio input jack assembly that reduces clutter and improves access to VESS controls and a gearshift within the automotive vehicle.

In carrying out the present invention, an audio input jack assembly is provided for allowing various portable electronic devices to transmit a plurality of audio signals to the VESS. The audio input jack assembly is located in a remotely located region of the automotive vehicle to reduce clutter and improve access to VESS controls and the gearshift.

There is disclosed herein a system for providing an auxiliary audio input for a VESS. The VESS includes a portable electronic audio device for generating an auxiliary plurality of audio signals. An auxiliary output line terminating at an end with a plug is coupled to the portable electronic audio device. The plug is mated with an audio input jack assembly that is fixedly coupled to a remotely located region of an automotive vehicle external to the VESS. The auxiliary plurality of audio signals are then communicated through the auxiliary output line to the audio input jack assembly. Then, the auxiliary plurality of audio signals is transmitted through an auxiliary input line to the VESS.

One advantage of the invention is that a user having an automotive vehicle with an audio input jack assembly integrated therein may listen to an audio program generated by various portable electronic audio devices even if the VESS lacks a similar component. Another advantage of the invention is that the audio input jack assembly is located in a remotely located region of the vehicle so as to reduce obstruction to VESS controls and the gearshift.

Additional advantages and features of the present invention will become apparent upon reading the following detailed description and appended claims, and upon reference to the accompanying drawings.

BRIEF DESCRIPTION OF DRAWINGS

For a more complete understanding of this invention, reference should now be had to the embodiments illustrated in greater detail in the accompanying drawings and described below by way of examples of the invention. In the drawings:

FIG. 1A is a perspective view of an audio input jack assembly in accordance with a preferred embodiment of the present invention.

FIG. 1B is an exploded perspective view of the audio input jack assembly in FIG. 1A.

DETAILED DESCRIPTION

Figure 2A:
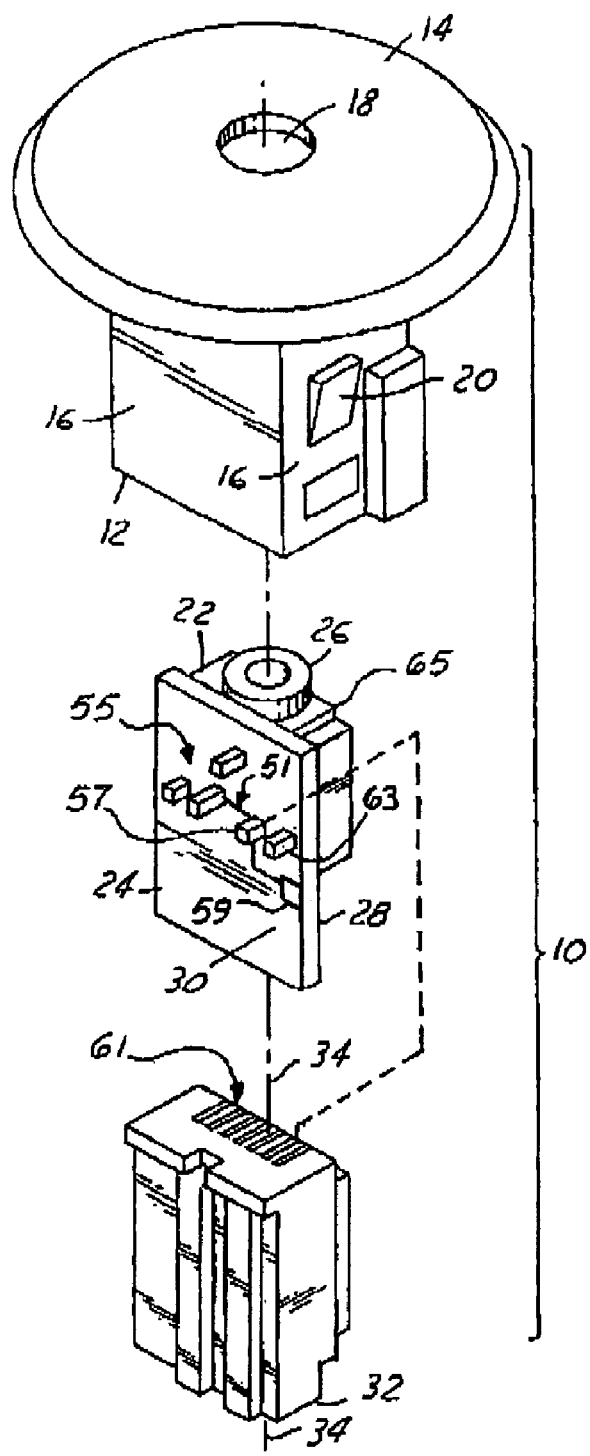
FIG. 2A is a perspective view of an audio input jack assembly in accordance with an alternate embodiment of the present invention.

Best Modes for Carrying Out the Invention

In the following figures, the same reference numerals are used to identify the same components in the various views.

Figure 3:
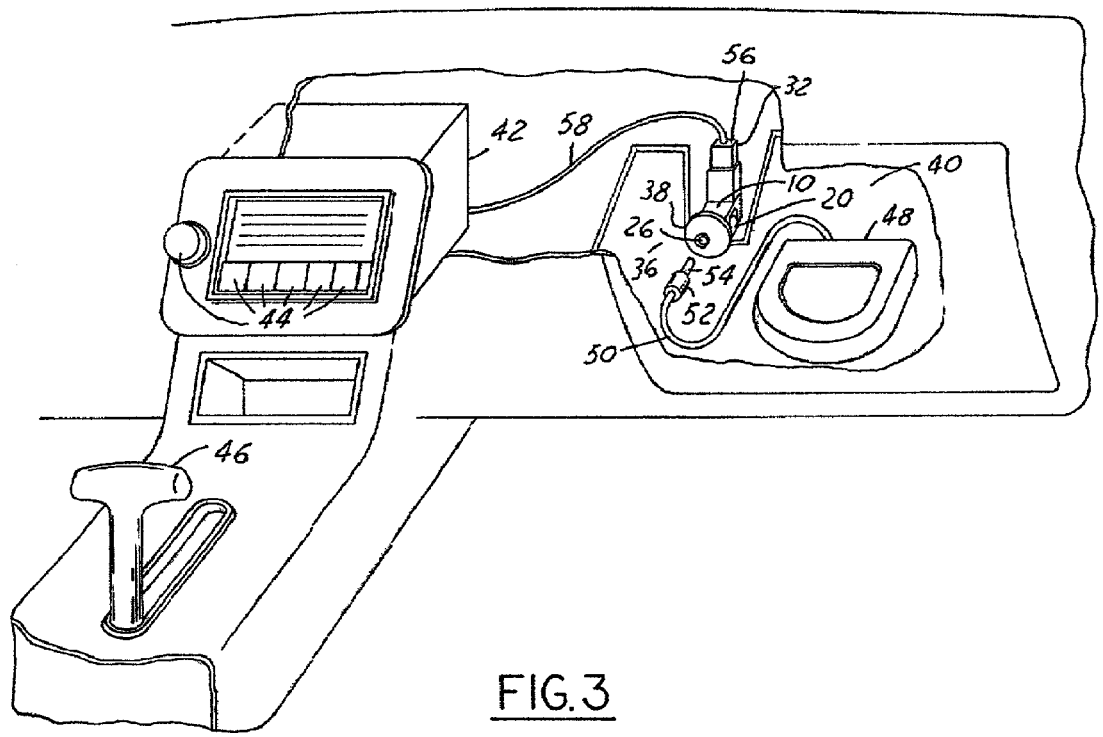
FIG. 3 is a partially cut away perspective view of a vehicular passenger cabin in accordance with a preferred embodiment of the present invention.

Referring now to FIGS. 1A and 1B, an audio input jack assembly 10 is shown in a perspective view and an exploded perspective view, respectively, according to a preferred embodiment of the invention. In this embodiment, the audio input jack assembly 10 includes a nonconductive connector housing 12 having a plug receiving wall 14 and at least two fastening walls 16. The plug receiving wall 14 typically has an aperture 18 integrally formed therein. The fastening walls 16 preferably extend perpendicularly from the plug receiving wall 14. Typically, at least one fastener 20 is integrally formed within at least one of the fastening walls 16. The fastener 20 then engages an opposing fastener 38 integrally formed within a panel section 36 of the automotive vehicle (as best shown in FIG. 3). The panel section 36 is preferably located in a remotely located region 40 of the automotive vehicle.

The audio input jack assembly 10 also includes a printed circuit board assembly 22 typically comprising a printed circuit board 24 (PCB) and a tubular sleeve 26. The printed circuit board has wires integrated therein for permitting the transmission of electronic signals. The printed circuit board 24 typically has a first side 28 and a second side 30. Preferably, the second side 30 of the PCB 24 is fixedly coupled to at least one of the fastening walls 16. The tubular sleeve 26 is fixedly coupled to the first side 28 of the PCB 24.

As mentioned above, FIGS. 1A and 1B illustrate a preferred embodiment of the audio input jack assembly 10. According to this embodiment, an electrical terminal 32 is fixedly coupled to the first side 28 of the PCB 24 such that a connection axis 34 of the electrical terminal 32 is perpendicular to the first side 28 of the PCB 24. This configuration decreases the depth of space occupied by the audio input jack assembly 10 behind the panel section 36. As a result, the audio input jack assembly 10 may be placed in a panel section 36 where less space is available behind the panel section 36.

Figure 2B:
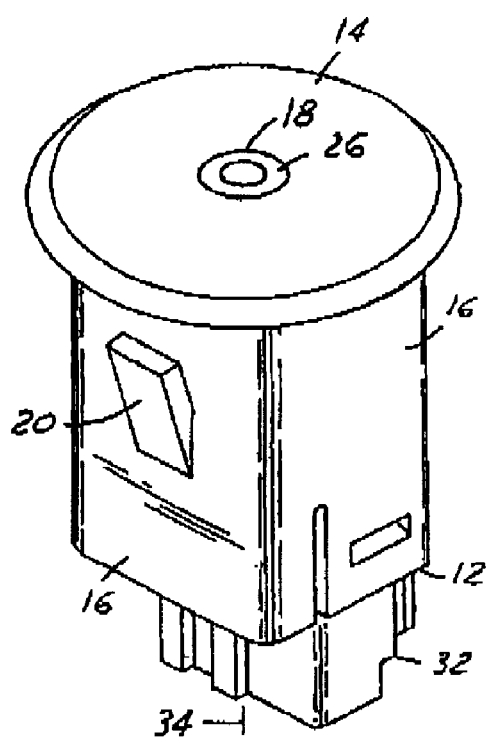
FIG. 2B is an exploded perspective view of the audio input jack assembly in FIG. 2A.

FIGS. 2A and 2B illustrate an alternate embodiment of the audio input jack assembly 10. According to this embodiment, an electrical terminal 32 is fixedly coupled to the first side 28 of the PCB 24 such that a connection axis 34 of the electrical terminal 32 is parallel to the first side 28 of the PCB 24.

Turning now to FIG. 3, there is illustrated a partially cut away perspective view of the audio input jack assembly 10 coupled to a panel section 36 of the automotive vehicle according to the preferred embodiment of the present invention. As mentioned above, the audio input jack assembly 10 has at least one fastener 20 on at least one of the fastening walls 16. The fastener 20 engages an opposing fastener 38 integrally formed within the panel section 36 of the automotive vehicle, thereby attaching the audio input jack assembly 10 to the automotive vehicle. Preferably, the fastener 20 and opposing fastener 38 are a pair of opposing snap-fit fasteners. Of course, other types of fasteners may be used, as the invention requires.

The panel section 36 of the automotive vehicle is located external to the vehicular entertainment sound system (VESS) 42 and within a remotely located region 40 of the automotive vehicle. The remotely located region 40 is located at a distance from the VESS 42 so as to permit unobstructed access to the VESS controls 44 and the gearshift 46 of the automotive vehicle. For example, the audio input jack assembly 10 and the portable electronic audio device 48 may be placed inside a glove compartment out of the view of vehicular occupants. Alternatively, the audio input jack assembly 10 and portable electronic audio device 48 may be located in a center console of the automotive vehicle. Obviously, the remotely located region is not limited to these two examples.

Another benefit of placing the audio input jack assembly 10 and portable electronic audio device 48 in a remotely located region 40 is an improvement in safety precaution for vehicular occupants. For example, placement of the audio input jack assembly 10 and portable electronic audio device 48 in at least one of the center console and the glove compartment reduces the possibility of injury caused by the portable electronic device 48 in a high speed collision.

In operation, the portable electronic audio device 48 generates an auxiliary plurality of audio signals from a particular medium. For example, a portable CD player may create audio signals by playing a CD. An auxiliary output line 50 is coupled to the portable electronic audio device 48. The auxiliary output line 50 typically terminates at an end with a plug 52. The plug 52 is then mated to the audio input jack assembly 10 integrally formed in a panel section 36 of the automotive vehicle. Then, the auxiliary plurality of audio signals is transmitted through the auxiliary output line 50 to the audio input jack assembly 10.

More specifically, a contact 54 of the plug 52 is inserted into the aperture 18 of the plug receiving wall 14 of the audio input jack assembly 10. The tubular sleeve 26 of the audio input jack assembly 10 receives the contact 54 thereby activating a transistor 55 (shown in FIG. 1B) within the audio input jack assembly 10 and simultaneously opening a switch 57 that connects the circuit 51 to a ground 59. The auxiliary plurality of audio signals 61 is then transmitted through the printed circuit board 24 to an electrical terminal 32 fixedly attached to the first side 28 of the printed circuit board 24. Then, an opposing electrical terminal 56 mateably coupled to the electrical terminal 32 receives the auxiliary plurality of audio signals 61 and subsequently transmits the auxiliary plurality of audio signals 61 through an auxiliary input line 58 to the VESS 42.

In another embodiment of the present invention, a controller 63 stores a database of mode balance coefficients for various audio sources. Mode balance is the method by which various audio source levels are scaled to have similar audio output in the VESS 42. For example, the following scale may be employed:

| AUDIO PROGRAM SOURCE OUTPUT LEVEL MATCHING REQUIREMENTS TABLE (LEVELS REFERENCED TO STANDARD 100% MONO FM) | | | | | |
|---|---|---|---|---|---|
| PROGRAM SOURCE AND CONDITION | | Min | Target | Max | Unit |
| Tuner AM | (100% MONO Modulation, 10 mV RF) | 0 | +1.0 | +2.0 | dB |
| Cassette Tape | (400 Hz Dolby level calibration tape, ABEX TCC-130 or Tcac MTT-150) | 0 | +1.0 | +2.0 | dB |
| Compact Disc | (Compression Off, −7.5 dB CD Level) | 0 | +1.0 | +2.0 | dB |
| MONO/Cell Phone Input | (776 mV$_{rmsd}$ = 5.16 kHz Peak Deviation, Compandor Enabled) | 0 | +1.0 | +2.0 | dB |

Further, the controller 63 automatically sets the volume output of the VESS 42 at a default volume level whenever a portable electronic device 48 is connected to the VESS 42. Such volume control is necessary to protect the driver from being surprised by differences in output voltages of the portable electronic device 48. For example, the output voltage from a headphone jack may be much greater than the output voltage from line-out jack. This volume control may be accomplished by utilizing a plug sensor 65 in the audio input jack assembly 10. This plug sensor 65 may simply be a switch that closes when the sleeve 26 receives the contact 54 of the plug 52. Upon receiving input from the plug sensor 65, the controller 63 actuates the VESS 42 to set the volume at a default level. By doing so, volume control is established and the driver is protected from surprising volume levels.

While particular embodiments of the present invention have been shown and described, numerous variations and alternate embodiments will occur to those skilled in the art. Accordingly, it is intended that the invention be limited only in terms of the appended claims.

The invention claimed is:

1. An audio input jack assembly, comprising:
  a nonconductive housing;
  a printed circuit board attached to said nonconductive housing; and
  a tubular sleeve attached to said printed circuit board and adapted for receiving a contact of a plug for a portable electronic audio device;
  said printed circuit board including a circuit comprised of a transistor and an electrical terminal;
  said tubular sleeve receiving a plurality of auxiliary audio signals from said contact of said plug;
  said tubular sleeve transmitting said plurality of auxiliary audio signals through said printed circuit board to said electrical terminal;
  said transistor terminating a primary acoustical transmission and initiating an auxiliary acoustical transmission of said plurality of auxiliary audio signals on a vehicular entertainment sound system.

2. The audio input jack assembly recited in claim 1 wherein said tubular sleeve is aligned with an aperture in said nonconductive housing.

3. The audio input jack assembly recited in claim 1 wherein said nonconductive housing has a plug receiving wall and at least two fastening walls.

4. The audio input jack assembly recited in claim 3 wherein said plug receiving wall has an aperture receiving said contact of said plug.

5. The audio input jack assembly recited in claim 3 wherein said at least two fastening walls extend from said plug receiving wall with said at least two fastening walls having at least one fastener mating with at least one opposing fastener integrally formed within a panel section of said automotive vehicle.

6. The audio input jack assembly recited in claim 5 wherein said panel section is located remote from a vehicular entertainment sound system within said automotive vehicle.

7. The audio input jack assembly recited in claim 3 wherein said printed circuit board has a first side and a second side coupled to one of said at least two fastening walls.

8. The audio input jack assembly recited in claim 7 wherein said first side of said printed circuit board is fixedly coupled to said electrical terminal.

9. The audio input jack assembly recited in claim 8 wherein said electrical terminal has a connection axis that is perpendicular to said first side of said printed circuit board for mating with an opposing electrical terminal along said connection axis.

10. The audio input jack assembly recited in claim 7 wherein said tubular sleeve is fixedly coupled to said first side of said printed circuit board.

11. A system for providing an auxiliary audio input for a vehicular entertainment sound system, the system comprising:
  a portable electronic audio device generating a plurality of audio signals;
  said portable electronic audio device communicating said plurality of audio signals through an auxiliary output line terminating at an end with a plug;
  said audio input jack assembly recited in claim 1;
  said audio input jack assembly mated with said plug and receiving said plurality of audio signals from said portable electronic audio device;
  said audio input jack assembly fixedly coupled to a panel section of said automotive vehicle; and
  said vehicular entertainment sound system located remote from said panel section;
  said portable electronic audio device selected from the group consisting of a compact disk player, audiocassette player, a cell phone, and an MP3 player.

12. The system recited in claim 11 wherein said audio input jack assembly is located in at least one of a glove compartment interior and a center console interior.

13. An audio input jack assembly, comprising:
  a nonconductive housing;
  a printed circuit board attached to said nonconductive housing; and
  a tubular sleeve attached to said printed circuit board and adapted for receiving a contact of a plug for a portable electronic audio device;
  said printed circuit board including a circuit comprised of a transistor, a switch, an electrical terminal, and a controller;
  said tubular sleeve receiving a plurality of auxiliary audio signals from said contact of said plug;
  said tubular sleeve transmitting said plurality of auxiliary audio signals through said printed circuit board to said electrical terminal as a function of activating said switch;
  said switch connecting said circuit to said ground;
  said transistor terminating a primary acoustical transmission and initiating an auxiliary acoustical transmission of said plurality of auxiliary audio signals on a vehicular entertainment sound system;
  said controller storing a database of mode balance coefficients and providing a predetermined audio output level for a plurality of said portable electronic audio devices.

14. A system for providing an auxiliary audio input for a vehicular entertainment sound system, the system comprising:
  a portable electronic audio device generating a plurality of audio signals;
  said portable electronic audio device communicating said plurality of audio signals through an auxiliary output line terminating at an end with a plug;
  said audio input jack assembly recited in claim 13;
  said audio input jack assembly mated with said plug and receiving said plurality of audio signals from said portable electronic audio device;
  said audio input jack assembly fixedly coupled to a panel section of an automotive vehicle; and
  said vehicular entertainment sound system located remote from said panel section;

said portable electronic audio device selected from the group consisting of a compact disk player, audiocassette player, a cell phone, and an MP3 player.

15. The system recited in claim 14 wherein said printed circuit board includes a plug sensor coupled to said controller and detecting when said contact is inserted in said tubular sleeve.

16. The system recited in claim 14 wherein said controller sets a volume for said vehicular entertainment sound system at a default level.

17. The system recited in claim 14 wherein said electrical terminal is coupled to an opposing electrical terminal.

18. The system recited in claim 17 wherein said opposing electrical terminal is coupled to said vehicular entertainment sound system by an auxiliary input line.

19. An audio input jack assembly for an automotive vehicle, comprising:
   a nonconductive housing;
   a printed circuit board attached to said nonconductive housing; and
   a tubular sleeve attached to said printed circuit board and adapted for receiving a contact of a plug;
   said printed circuit board including a circuit comprised of a transistor, a switch, a ground, and an electrical terminal;
   said tubular sleeve receiving a plurality of auxiliary audio signals from said contact of said plug;
   said switch connecting said circuit to said ground;
   said transistor activating said switch when said tubular sleeve receives said contact of said plug;
   said tubular sleeve transmitting said plurality of auxiliary audio signals through said printed circuit board to said electrical terminal as a function of activating said switch;
   said transistor terminating a primary acoustical transmission and initiating an auxiliary acoustical transmission of said plurality of auxiliary audio signals on a vehicular entertainment sound system;
   said controller storing a database of mode balance coefficients and providing a predetermined audio output level for a plurality of said portable electronic audio devices.

20. A system for providing an auxiliary audio input for a vehicular entertainment sound system, the system comprising:
   a portable electronic audio device generating a plurality of audio signals;
   said portable electronic audio device communicating said plurality of audio signals through an auxiliary output line terminating at an end with a plug;
   said audio input jack assembly recited in claim 19;
   said audio input jack assembly mated with said plug and receiving said plurality of audio signals from said portable electronic audio device;
   said audio input jack assembly fixedly coupled to a panel section of an automotive vehicle;
   said vehicular entertainment sound system located remote from said panel section; and
   said portable electronic audio device selected from the group consisting of a compact disk player, audiocassette player, a cell phone, and an MP3 player;
   said printed circuit board having a first side and a second side;
   said first side of said printed circuit board attached to said tubular sleeve and said electrical terminal;
   said electrical terminal has a connection axis that is perpendicular to said first side of said printed circuit board for mating with an opposing electrical terminal along said connection axis;
   said tubular sleeve aligned with an aperture formed in said nonconductive housing;
   said nonconductive housing having a plug receiving wall and at least two fastening walls;
   said plug receiving wall with said aperture for receiving said contact of said plug;
   said at least two fastening walls extending from said plug receiving wall and having at least one fastener;
   said at least one fastener mating with at least one opposing fastener in said panel section of said automotive vehicle;
   said panel section located in one of a glove compartment interior and a center console interior;
   said controller setting a volume for said vehicular entertainment sound system to a default level;
   said opposing electrical terminal coupled to said vehicular entertainment sound system by an auxiliary input line.

* * * * *